United States Patent
Maruyama (10) Patent No.: US 11,189,417 B2
(45) Date of Patent: Nov. 30, 2021

(54) TRANSFORMER DEVICE (71) Applicant: Yazaki Corporation, Tokyo (JP)

(72) Inventor: Akinori Maruyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 311 days.

(21) Appl. No.: 16/599,755

(22) Filed: Oct. 11, 2019

(65) Prior Publication Data

US 2020/0043648 A1    Feb. 6, 2020

Related U.S. Application Data (63) Continuation of application No. PCT/JP2017/047174, filed on Dec. 28, 2017.

(30) Foreign Application Priority Data

May 10, 2017    (JP) .............................. JP2017-093863

(51) Int. Cl.
*H01F 27/30*        (2006.01)
*H01F 27/28*        (2006.01)
(Continued)

(52) U.S. Cl.
CPC ......... *H01F 27/2828* (2013.01); *H01F 27/28* (2013.01); *H01F 27/30* (2013.01);
(Continued)

(58) Field of Classification Search
CPC .... H01F 27/2828; H01F 27/30; H01F 27/325; H01F 30/10; H01F 38/08; H01F 27/2804;
(Continued)

(56) References Cited

U.S. PATENT DOCUMENTS

| 9,000,874 B2 * | 4/2015 | Kim ....................... H01F 27/306 |
| | | 336/170 |
| 2008/0101097 A1 * | 5/2008 | Kawasaki ............. H01F 27/255 |
| | | 363/20 |

(Continued)

FOREIGN PATENT DOCUMENTS

| JP | 2003-272929 A | 9/2003 |
| JP | 2005-012005 A | 1/2005 |

(Continued)

*Primary Examiner* — Tuyen T Nguyen
(74) *Attorney, Agent, or Firm* — Sughrue Mion, PLLC (57) ABSTRACT

A transformer device includes a transformer including a primary winding formed by winding a first conductor and a secondary winding provided to face the primary winding and formed by winding a second conductor, a first wire connected to the primary winding and drawn out to one side, a second wire connected to the secondary winding and drawn out to the same side as that of the first wire, a base material provided on the side from which the first wire and the second wire are drawn out, a primary circuit provided on the base material and connected to the primary winding via the first wire, and a secondary circuit provided on the base material and connected to the secondary winding via the second wire. With this configuration, the transformer device has an effect in that a structural waste can be suppressed.

3 Claims, 5 Drawing Sheets

(51) Int. Cl.
 *H01F 27/32* (2006.01)
 *H01F 30/10* (2006.01)
 *H01F 38/08* (2006.01)
 *H02M 3/28* (2006.01)

(52) U.S. Cl.
 CPC ........... *H01F 27/325* (2013.01); *H01F 30/10* (2013.01); *H01F 38/08* (2013.01); *H02M 3/28* (2013.01)

(58) Field of Classification Search
 CPC .... H01F 27/40; H01F 27/2847; H01F 27/306; H02M 3/28
 See application file for complete search history.

(56) References Cited

U.S. PATENT DOCUMENTS

| | | | |
|---|---|---|---|
| 2012/0161696 A1 | 6/2012 | Cook et al. | |
| 2016/0027570 A1* | 1/2016 | Sakamoto | H01F 27/2804 336/200 |
| 2017/0324343 A1* | 11/2017 | Ishigaki | H01F 27/325 |

FOREIGN PATENT DOCUMENTS

| | | | |
|---|---|---|---|
| JP | 2007109735 A | 4/2007 | |
| JP | 2013140859 A | 7/2013 | |
| WO | 2015125527 A1 | 8/2005 | |

\* cited by examiner

TRANSFORMER DEVICE

CROSS-REFERENCE TO RELATED APPLICATION

This application is a continuation application of International Application PCT/JP2017/047174, filed on Dec. 28, 2017 which claims the benefit of priority from Japanese Patent application No. 2017-093863 filed on May 10, 2017 and designating the U.S., the entire contents of which are incorporated herein by reference.

BACKGROUND OF THE INVENTION

1. Field of the Invention

The present invention relates to a transformer device.

2. Description of the Related Art

Conventionally, there have been transformer devices that transform voltage. A transformer device includes, for example, a transformer having a primary winding and a secondary winding, a primary circuit connected to the primary winding via a first wire, and a secondary circuit connected to the secondary winding via a second wire (for example, Japanese Patent Application Laid-open No. 2003-272929).

Incidentally, depending on the arrangement of the first and the second wires and the primary and the secondary circuits, the conventional transformer device may cause a structural waste, and there is room for further improvement in this regard.

SUMMARY OF THE INVENTION

The present invention has been made in view of the foregoing, and an object of the invention is to provide a transformer device capable of suppressing the structural waste.

In order to solve the above mentioned problem and achieve the object, a transformer device according to one aspect of the present invention includes a transformer including a primary winding formed by winding a first conductor and a secondary winding provided to face the primary winding and formed by winding a second conductor; a first wire connected to the primary winding and drawn out to one side; a second wire connected to the secondary winding and drawn out to same side as that of the first wire; a base material provided on a side from which the first wire and the second wire are drawn out; a primary circuit provided on the base material and connected to the primary winding via the first wire; and a secondary circuit provided on the base material and connected to the secondary winding via the second wire, wherein the primary circuit and the secondary circuit are provided side by side along a crossing direction that intersects with a drawing direction in which the first wire and the second wire are drawn out, the primary winding includes a leakage inductor that does not contribute to transformation, and the leakage inductor is provided on the primary circuit side in the crossing direction.

According to another aspect of the present invention, in the transformer device, it is preferable that the primary winding is formed by winding a flat plate-like and linear first conductor around both axis lines of a coil axis line and a leakage-inductor axis line located more toward the primary circuit side in the crossing direction than the coil axis line, the secondary winding is formed by winding a flat plate-like and linear second conductor around the coil axis line, and the primary winding and the secondary winding are layer-stacked along a coil axis direction that is a direction along the coil axis line.

According to still another aspect of the present invention, in the transformer device, it is preferable that a magnetic member on which the primary winding and the secondary winding are provided and containing a magnetic material, wherein the magnetic member includes a wall portion annularly provided around the coil axis line and surrounding outer circumferences of the primary winding and the secondary winding, and the wall portion includes an opening that is opened on the primary circuit and the secondary circuit side, for which an opening angle centering the coil axis line is 120° to 180°, and that exposes the leakage inductor and terminals of the secondary winding.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

With reference to the accompanying drawings, a form to implement the present invention (an exemplary embodiment) will be described in detail. The present invention is not intended to be limited by the content of the following embodiment described. Furthermore, the constituent elements described in the following include those that a person skilled in the art can easily assume or that are substantially the same. The configurations described in the following can be combined as appropriate. Moreover, various omissions, substitutions, or modifications of the configurations can be made without departing from the scope of the invention.

Embodiment

Figure 1:
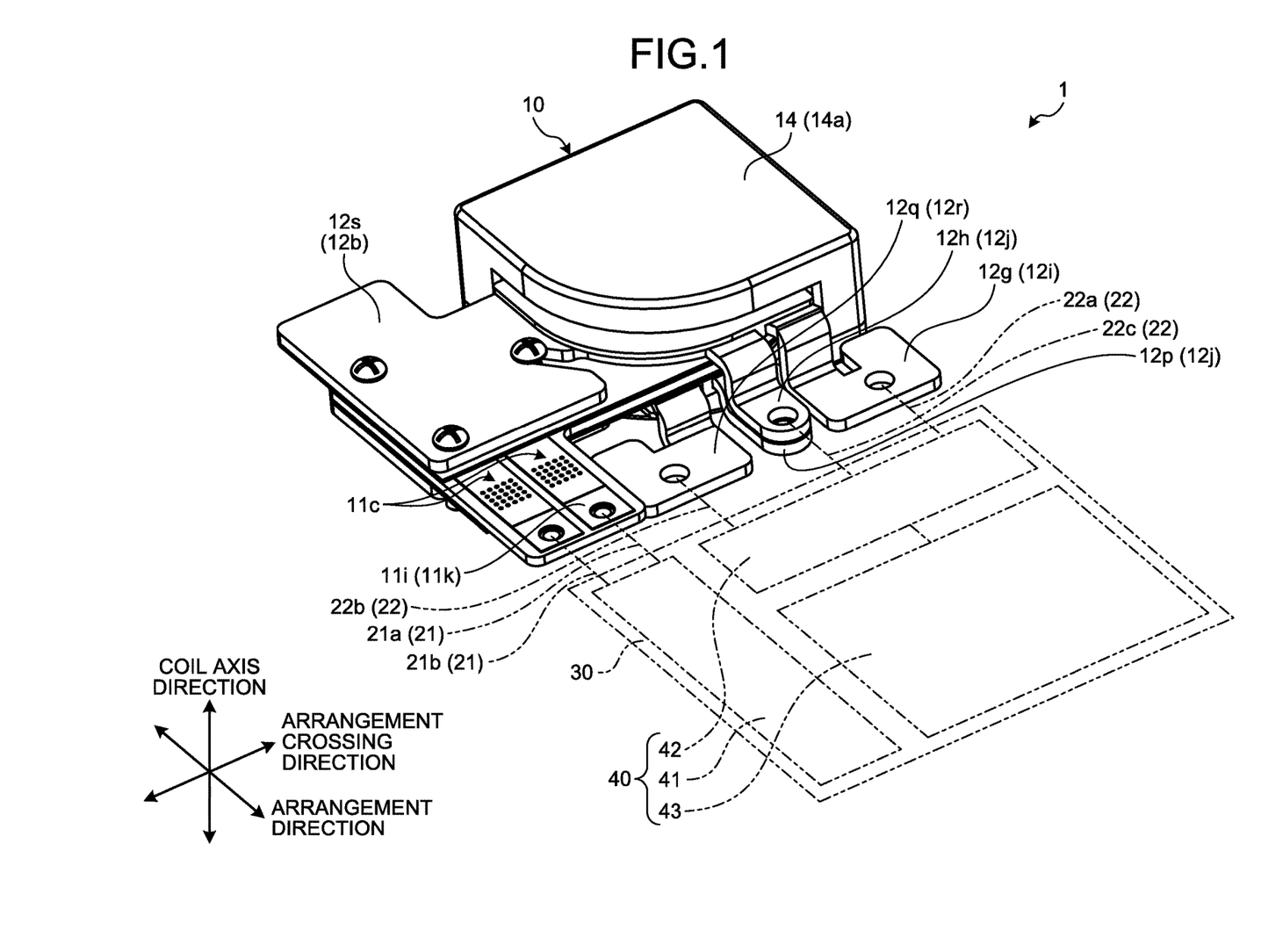
FIG. 1 is a perspective view illustrating a configuration example of a transformer device according to an embodiment.
Figure 2:
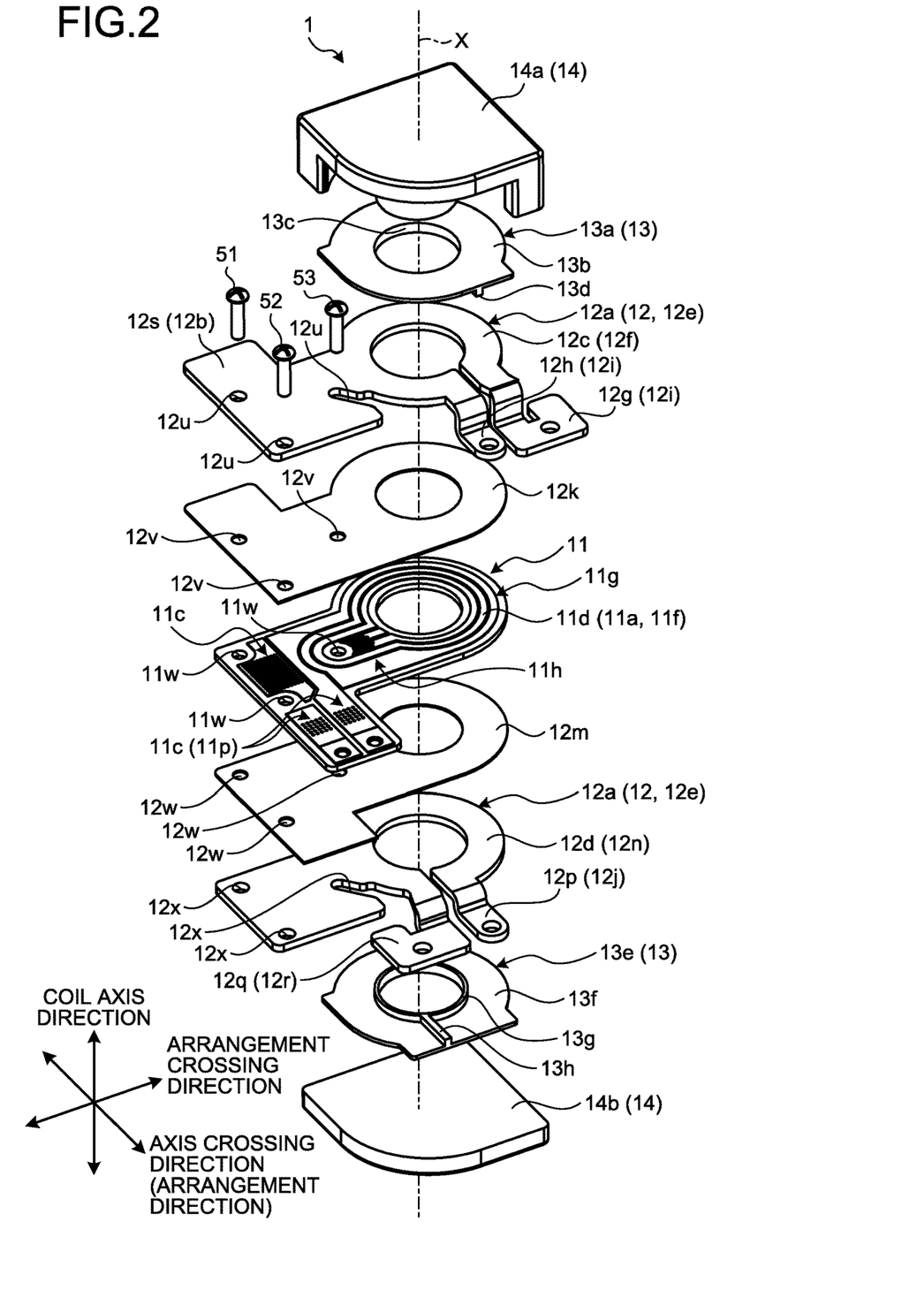
FIG. 2 is an exploded perspective view illustrating a configuration example of the transformer device in the embodiment.

A transformer device 1 according to an embodiment will be described. The transformer device 1 is a device that transforms voltage. The transformer device 1 is a thin transformer device for a DC-DC converter, and steps down the voltage and outputs large current, for example. The transformer device 1 includes, as illustrated in FIG. 1 and FIG. 2, a transformer 10, first and second wires 21 and 22, a base material 30, and a circuit unit 40 having a primary circuit 41, a secondary circuit 42, and a control circuit 43.

A coil axis direction is a direction along a coil axis line X. An axis crossing direction is a direction that intersects the coil axis direction, and typically, is a direction orthogonal to the coil axis direction. An arrangement direction is a direction in which the transformer 10 and the circuit unit 40 are arranged. An arrangement crossing direction is a direction that intersects the arrangement direction, and typically, is a direction orthogonal to the arrangement direction.

Figure 3:
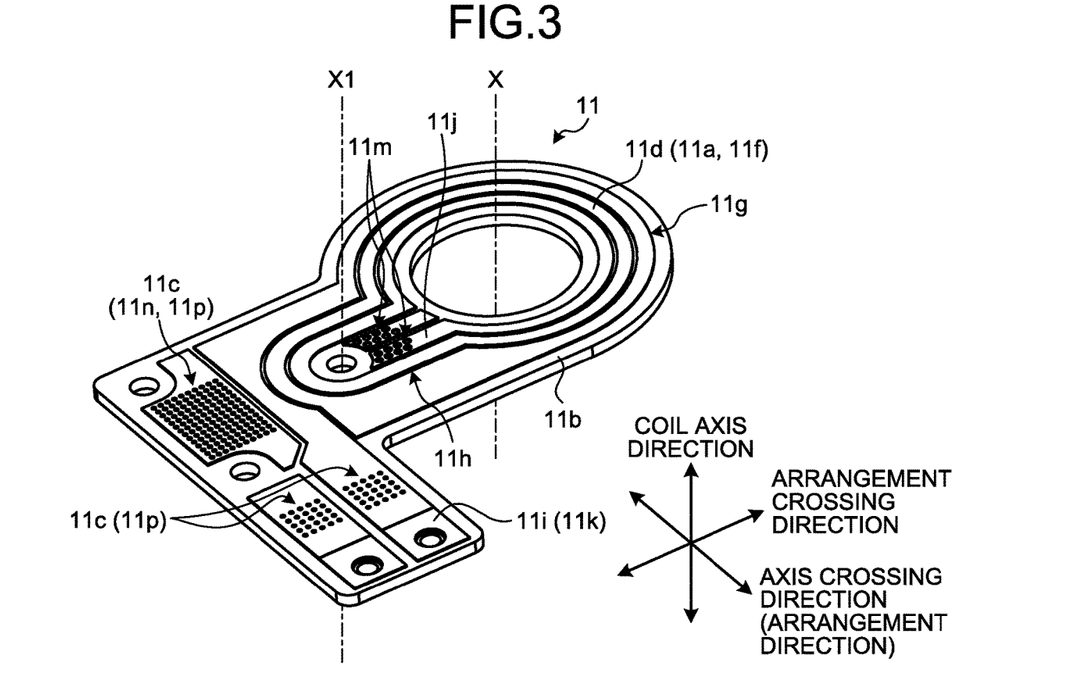
FIG. 3 is a perspective view illustrating a configuration example of a surface side of a primary winding in the embodiment.
Figure 4:
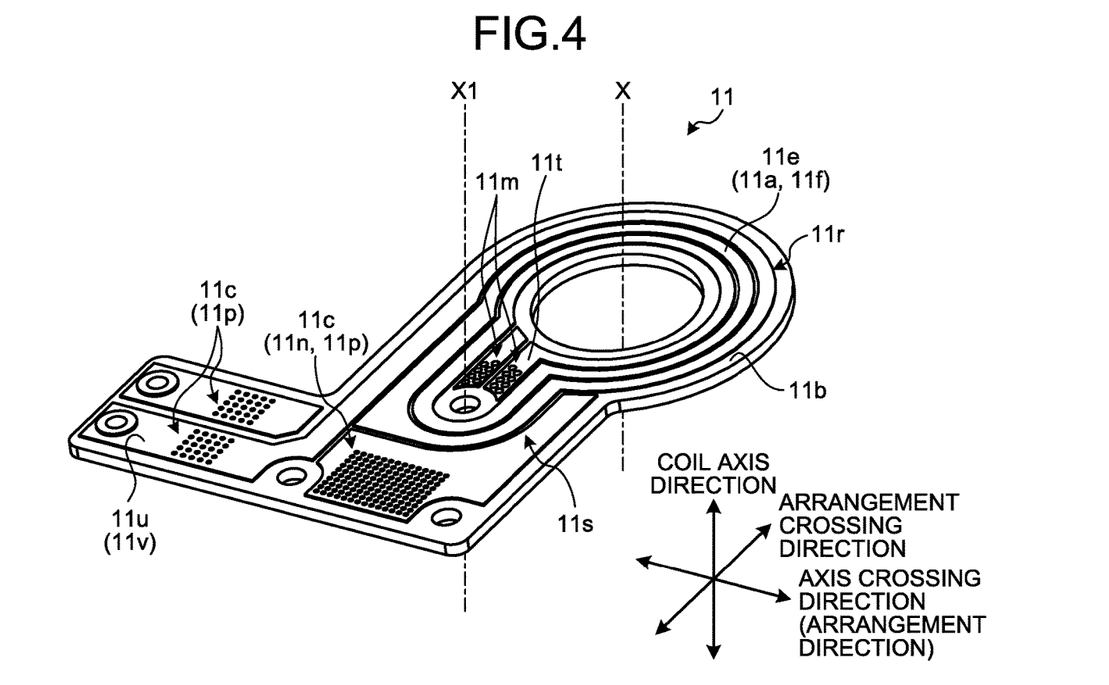
FIG. 4 is a perspective view illustrating a configuration example of a rear surface side of the primary winding in the embodiment.

The transformer 10 is an electrical transformer that transforms voltage. The transformer 10 includes a primary winding portion 11, a secondary winding portion 12, a bobbin 13, and a ferrite 14. The primary winding portion 11 includes, as illustrated in FIG. 3 and FIG. 4, a primary winding 11a, an insulative plate-like insulating plate 11b, and cooling vias 11c. The insulating plate 11b is a four-layer substrate, and is made up of a first layer to a fourth layer. In the insulating plate 11b, the first layer and the fourth layer constitute surface layers, and the second layer and the third layer constitute inner layers.

The primary winding 11a includes a front-side primary winding 11d that is provided on the surface of the first layer of the insulating plate 11b, a back-side primary winding 11e that is provided on the rear surface of the fourth layer of the insulating plate 11b, and inner-layer side primary windings (not depicted) that are provided on respective mounting surfaces of the second layer and the third layer of the insulating plate 11b. The front-side primary winding 11d is a coil that is formed by spirally winding a flat plate-like and linear first conductor 11f around the coil axis line X and a leakage-inductor axis line X1 along the axis crossing direction. That is, the front-side primary winding 11d is a non-circular spiral coil that is formed such that the first conductor 11f circles both axis lines of the coil axis line X and the leakage-inductor axis line X1. The front-side primary winding 11d may be formed on the surface of the insulating plate 11b by etching as a conductor pattern, or may be provided with a conductor pattern formed by punching a conductor plate on the surface of the insulating plate 11b, for example. The leakage-inductor axis line X1 extends in the same direction as that of the coil axis line X, and is the axis line located on the primary circuit 41 side of the arrangement crossing direction with respect to the coil axis line X.

The front-side primary winding 11d includes a coil winding portion 11g that contributes to transformation, a leakage inductor 11h that does not contribute to the transformation, a winding start end iii that is an end portion of the winding start side, and a winding end portion 11j that is an end portion of the winding end side. The coil winding portion 11g is a portion provided around the coil axis line X. The coil winding portion 11g, when viewed from the coil axis direction, is a portion that overlaps with a secondary winding 12a which will be described later, and is formed in a circular shape. The leakage inductor 11h is an inductor for resonance, and is a portion provided around the leakage-inductor axis line X1. The leakage inductor 11h, when viewed from the coil axis direction, is a portion that does not overlap with the secondary winding 12a, and is formed in a non-circular shape. The leakage inductor 11h is provided on the primary circuit 41 side in the arrangement crossing direction (crossing direction). That is, the leakage inductor 11h is provided projecting toward the primary circuit 41 side from the coil winding portion 11g along the arrangement crossing direction. In the front-side primary winding 11d, the first conductor 11f is wound along the axis crossing direction from the inside toward the outside of the front-side primary winding 11d, and the winding start end 11i is located on the outer circumference side of the front-side primary winding 11d and the winding end portion 11j is located on the inner circumference side of the front-side primary winding 11d, for example. The winding start end 11i constitutes a terminal 11k and is located on the primary circuit 41 side in the arrangement direction.

The back-side primary winding 11e is in the same shape as that of the front-side primary winding 11d, and is layer-stacked on the front-side primary winding 11d along the coil axis direction with the insulating plate 11b interposed. The back-side primary winding 11e is a coil that is formed by spirally winding a flat plate-like and linear first conductor 11f around the coil axis line X and the leakage-inductor axis line X1 along the axis crossing direction. That is, the back-side primary winding 11e is a non-circular spiral coil that is formed such that the first conductor 11f circles both axis lines of the coil axis line X and the leakage-inductor axis line X1. The back-side primary winding 11e may be formed on the rear surface of the insulating plate 11b by etching as a conductor pattern, or may be provided with a conductor pattern formed by punching a conductor plate on the rear surface of the insulating plate 11b, for example.

The back-side primary winding 11e includes a coil winding portion 11r that contributes to the transformation, a leakage inductor 11s that does not contribute to the transformation, a winding start end 11t that is an end portion of the winding start side, and a winding end portion 11u that is an end portion of the winding end side. The coil winding portion 11r is a portion provided around the coil axis line X. The coil winding portion 11r, when viewed from the coil axis direction, is a portion that overlaps with the secondary winding 12a, and is formed in a circular shape. The leakage inductor 11s is a portion provided around the leakage-inductor axis line X1. The leakage inductor 11s, when viewed from the coil axis direction, is a portion that does not overlap with the secondary winding 12a, and is formed in a non-circular shape. The leakage inductor 11s is provided on the primary circuit 41 side in the arrangement crossing direction (crossing direction). That is, the leakage inductor 11s is provided projecting toward the primary circuit 41 side from the coil winding portion 11r along the arrangement crossing direction. In the back-side primary winding 11e, the first conductor 11f is wound along the axis crossing direction from the inside toward the outside of the back-side primary winding 11e, and the winding start end 11t is located on the inner circumference side of the back-side primary winding 11e and the winding end portion 11u is located on the outer circumference side of the back-side primary winding 11e, for example. The winding end portion 11u constitutes a terminal 11v and is located on the primary circuit 41 side in the arrangement direction. In the insulating plate (four-layer substrate) 11b, the inner layers and the surface layers are electrically connected by through holes 11m and two layers of the inner layers are electrically connected by the cooling vias 11c. That is, in the insulating plate 11b, the front-side primary winding 11d of the first layer and the inner-layer side primary winding of the second layer are electrically connected via the through holes 11m, the inner-layer side primary winding of the second layer and the inner-layer side primary winding of the third layer are electrically connected via the cooling vias 11c, and the inner-layer side primary winding of the third layer and the back-side primary winding 11e of the fourth layer are electrically connected via the through holes 11m. As a result, in the primary winding 11a, when an AC voltage is applied to the terminal 11k of the front-side primary winding 11d and the terminal 11v of the back-side primary winding 11e, a current flows through the primary winding 11a.

The cooling vias 11c cool the primary winding portion 11. In the cooling vias 11c, in a state where a metal plate 11n is provided on the insulating plate 11b, a plurality of through holes 11p that run through the metal plate 11n and the insulating plate 11b along the coil axis direction are provided, for example.

Figure 5:
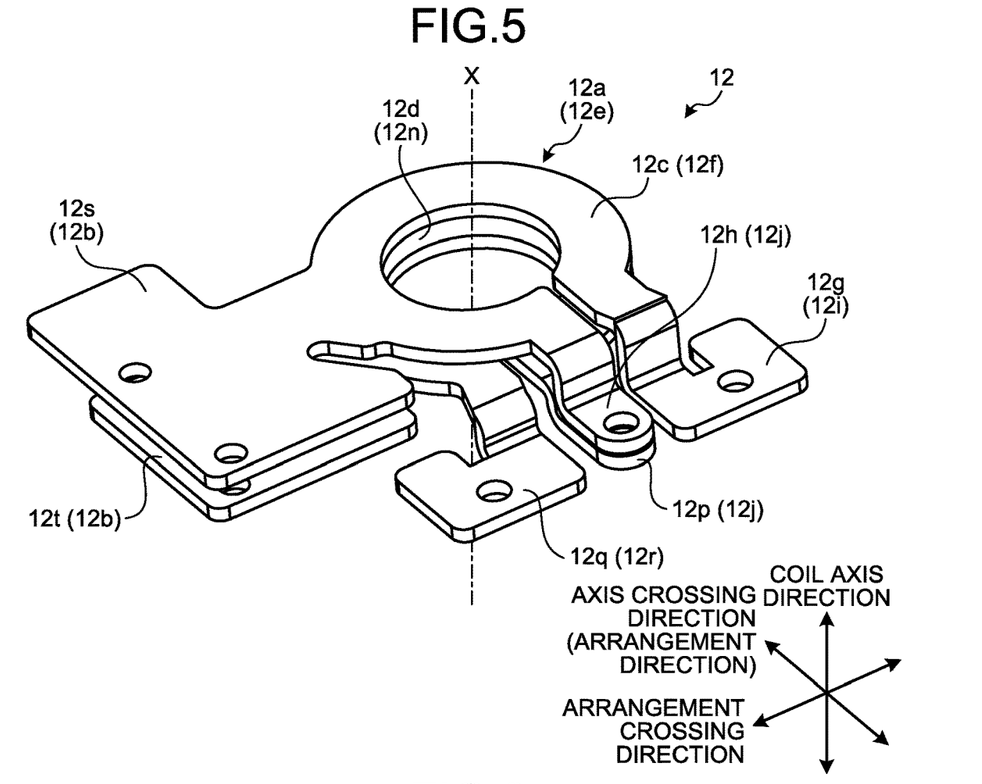
FIG. 5 is a perspective view illustrating a configuration example of a secondary winding in the embodiment.

The secondary winding portion 12 includes, as illustrated in FIG. 5, the secondary winding 12a and a heatsink 12b. The secondary winding 12a is provided facing the primary winding 11a. The secondary winding 12a is configured with a smaller number of coil turns than that of the primary winding 11a. The secondary winding 12a is a coil of two turns (two rolls), and includes an upper secondary winding 12c and a lower secondary winding 12d that is layer-stacked on the upper secondary winding 12c in the coil axis direction, for example. The upper secondary winding 12c is an annular member that is formed by winding a flat plate-like and linear second conductor 12e one turn around the coil axis line X along the axis crossing direction. That is, the upper secondary winding 12c is an annular member that is formed such that the second conductor 12e circles the coil axis line X. The upper secondary winding 12c may be formed by punching a conductive plate, or may be formed by winding an elongated plate-like member, for example.

The upper secondary winding 12c includes a coil winding portion 12f that contributes to the transformation, a winding start end 12g that is an end portion of the winding start side, and a winding end portion 12h that is an end portion of the winding end side. The coil winding portion 12f is a portion provided around the coil axis line X. The coil winding portion 12f, when viewed from the coil axis direction, is a portion that overlaps with the coil winding portion 11g of the primary winding 11a, and is formed in a circular shape. In the upper secondary winding 12c, the winding start end 12g constitutes a terminal 12i and that is located on the secondary circuit 42 side in the arrangement direction. The upper secondary winding 12c further constitutes a coupling portion 12j at which the winding end portion 12h is coupled with the lower secondary winding 12d and that is located on the secondary circuit 42 side in the arrangement direction.

The lower secondary winding 12d is in the same shape as that of the upper secondary winding 12c, and is layer-stacked on the upper secondary winding 12c along the coil axis direction with the primary winding portion 11 interposed. The lower secondary winding 12d and the upper secondary winding 12c are insulated from the primary winding portion 11. For example, between the upper secondary winding 12c and the primary winding portion 11, a sheet-like upper insulating sheet 12k that insulates the upper secondary winding 12c and the primary winding portion 11 is provided (see FIG. 2). Similarly, between the lower secondary winding 12d and the primary winding portion 11, a sheet-like lower insulating sheet 12m that insulates the lower secondary winding 12d and the primary winding portion 11 is provided. The lower secondary winding 12d is an annular member that is formed by winding the flat plate-like and linear second conductor 12e one turn around the coil axis line X along the axis crossing direction. That is, the lower secondary winding 12d is an annular member that is formed such that the second conductor 12e circles the coil axis line X. The lower secondary winding 12d may be formed by punching a conductive plate, or may be formed by winding an elongated plate-like member, for example.

The lower secondary winding 12d includes a coil winding portion 12n that contributes to the transformation, a winding start end 12p that is an end portion of the winding start side, and a winding end portion 12q that is an end portion of the winding end side. The coil winding portion 12n is a portion provided around the coil axis line X. The coil winding portion 12n, when viewed from the coil axis direction, is a portion that overlaps with the coil winding portion 11g of the primary winding 11a, and is formed in a circular shape. The lower secondary winding 12d constitutes the coupling portion 12j at which the winding start end 12p is coupled with the upper secondary winding 12c and that is located on the secondary circuit 42 side in the arrangement direction. In the lower secondary winding 12d, the winding end portion 12q constitutes a terminal 12r and that is located on the secondary circuit 42 side in the arrangement direction.

The heatsink 12b includes an upper heatsink 12s that is provided on the coil winding portion 12f of the upper secondary winding 12c and a lower heatsink 12t that is provided on the coil winding portion 12n of the lower secondary winding 12d. The upper heatsink 12s is formed in a plate-like shape and extends along the arrangement crossing direction from one end of the coil winding portion 12f of the upper secondary winding 12c. The upper heatsink 12s dissipates heat generated at the coil winding portion 12f of the upper secondary winding 12c. The lower heatsink 12t is formed in a plate-like shape and extends along the arrangement crossing direction from one end of the coil winding portion 12n of the lower secondary winding 12d. The lower heatsink 12t dissipates heat generated at the coil winding portion 12n of the lower secondary winding 12d.

The bobbin 13 illustrated in FIG. 2 is a member that covers the coil winding portions 12f and 12n of the secondary winding 12a. The bobbin 13 includes an upper bobbin 13a that covers the coil winding portion 12f of the upper secondary winding 12c and a lower bobbin 13e that covers the coil winding portion 12n of the lower secondary winding 12d. The upper bobbin 13a includes an annular and plate-like annular member 13b extending in the axis crossing direction, a cylindrical tubular portion 13c extending in the coil axis direction from the inner side of the annular member 13b, and a projecting portion 13d projecting on the upper secondary winding 12c side of the annular member 13b. The annular member 13b, when viewed from the coil axis direction, covers the coil winding portion 12f of the upper secondary winding 12c. The tubular portion 13c is inserted into the inner side of the upper secondary winding 12c. The projecting portion 13d is fitted between an end portion on one side of the upper secondary winding 12c in the circumferential direction and an end portion on the other side. As a result, the upper bobbin 13a is attached, in a state where the coil winding portion 12f of the upper secondary winding 12c is covered from the coil axis direction, to the coil winding portion 12f of the upper secondary winding 12c.

The lower bobbin 13e is in the same configuration as that of the upper bobbin 13a, and includes an annular and plate-like annular member 13f extending in the axis crossing direction, a cylindrical tubular portion 13g extending in the coil axis direction from the inner side of the annular member 13f, and a projecting portion 13h projecting on the lower secondary winding 12d side of the annular member 13f. The annular member 13f, when viewed from the coil axis direction, covers the coil winding portion 12n of the lower secondary winding 12d. The tubular portion 13g is inserted into the inner side of the lower secondary winding 12d. The projecting portion 13h is fitted between an end portion on one side of the lower secondary winding 12d in the circumferential direction and an end portion on the other side. As a result, the lower bobbin 13e is attached, in a state where the coil winding portion 12n of the lower secondary winding 12d is covered from the coil axis direction, to the coil winding portion 12n of the lower secondary winding 12d.

Figure 6:
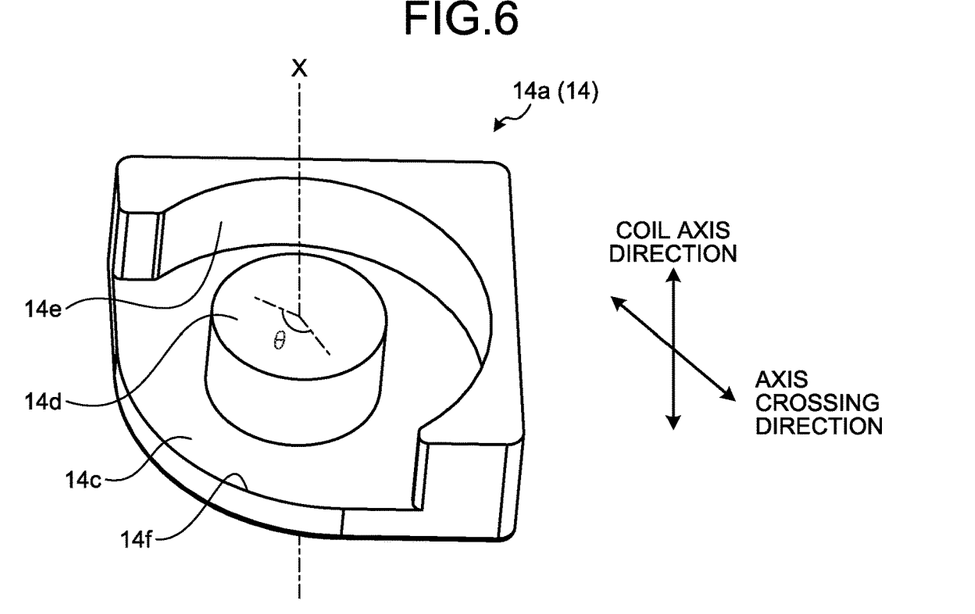
FIG. 6 is a perspective view illustrating a configuration example of a ferrite in the embodiment.

The ferrite 14 illustrated in FIG. 2 is a magnetic member that passes through the magnetic force (magnetic flux) generated by the primary winding 11a and the secondary winding 12a and suppresses the loss of the magnetic force. The ferrite 14 is a member containing a magnetic material, and is a composite oxide of iron oxide and metal, for example. The ferrite 14 is provided with the primary winding 11a and the secondary winding 12a, and includes an upper ferrite 14a provided on the upper secondary winding 12c side and a lower ferrite 14b provided on the lower secondary winding 12d side. The upper ferrite 14a, as illustrated in FIG. 6, includes a fan-shaped and plate-like upper surface portion 14c that is provided in the axis crossing direction, a pillar-shaped magnetic core 14d that extends along the coil axis direction from the center of the upper surface portion 14c on the primary winding 11a and the secondary winding 12a side and is inserted into the inner side of the primary winding 11a and the secondary winding 12a, and a wall portion 14e that is annularly provided around the coil axis line X and surrounds the outer circumferences of the primary winding 11a and the secondary winding 12a. The wall portion 14e includes an opening 14f that is opened on the side of the primary circuit 41 and the secondary circuit 42 which will be described later. On the magnetic core 14d, the primary winding 11a and the secondary winding 12a are wound. In the opening 14f, an opening angle θ centering the coil axis line X is, for example, 120° to 180° and, from the opening 14f, exposed are the leakage inductors 11h and 11s and the terminals 12i and 12r and the coupling portion 12j of the secondary winding 12a. In the opening 14f, the opening angle θ is set appropriately according to the size of the primary winding 11a and the secondary winding 12a. In the opening 14f, as the opening angle θ is relatively smaller, leakage of the magnetic force (magnetic flux) decreases and noise is reduced. In the opening 14f, in particular, when the opening angle θ is greater than 180°, the leakage of the magnetic force increases, and the noise is increased. As just described, it is desirable that the opening 14f make the opening angle θ small. However, because the thickness of the second conductor 12e of the secondary winding 12a is determined by the current and the like, the opening angle θ is set to 120° to 180° at present situation.

The lower ferrite 14b is a fan-shaped and plate-like member, and extends along the axis crossing direction. The lower ferrite 14b is combined with the upper ferrite 14a in the coil axis direction. The ferrite 14 sandwiches the primary winding 11a and the secondary winding 12a with the upper ferrite 14a and the lower ferrite 14b along the coil axis direction. In the transformer device 1, as a plurality of bolts 51 to 53 are inserted and tightened to holes 12u of the upper secondary winding 12c, holes 12v of the upper insulating sheet 12k, holes 11w of the primary winding portion 11, holes 12w of the lower insulating sheet 12m, and holes 12x of the lower secondary winding 12d, the respective members are fixed.

First wires 21 (21a, 21b) are connected to the primary winding 11a, and are drawn out to one side in the arrangement direction. For example, in the first wire 21a, one end is connected to the terminal 11k of the front-side primary winding 11d, and the other end is connected to the primary circuit 41. Furthermore, in the first wire 21b, one end is connected to the terminal 11v of the back-side primary winding 11e, and the other end is connected to the primary circuit 41.

Second wires 22 (22a to 22c) are connected to the secondary winding 12a, and are drawn out to the same side as that of the first wires 21. For example, in the second wire 22a, one end is connected to the terminal 12i of the upper secondary winding 12c, and the other end is connected to the secondary circuit 42. Furthermore, in the second wire 22b, one end is connected to the terminal 12r of the lower secondary winding 12d, and the other end is connected to the secondary circuit 42. In the second wire 22c, one end is connected to the coupling portion (center tap) 12j of the upper secondary winding 12c and the lower secondary winding 12d, and the other end is connected to the secondary circuit 42.

The base material 30 is an insulating plate-like member, and is provided on the side from which the first wires 21 and the second wires 22 are drawn out. The base material 30 is arranged side by side on one side of the transformer 10 along the arrangement direction. The base material 30 is formed in a rectangular shape, for example. In the base material 30, the short sides are along the arrangement direction and the long sides are along the arrangement crossing direction, for example.

The primary circuit 41 is a switching circuit including a plurality of switching elements and is provided on the base material 30, for example. The primary circuit 41 is arranged on the base material 30 so as to face the terminals 11k and 11v of the primary winding 11a in the arrangement direction. The primary circuit 41 is connected to a DC power source not depicted and the primary winding 11a, converts DC power that is output from the DC power source into AC power, and outputs the converted AC power to the primary winding 11a. The primary circuit 41 is mounted on the base material 30 side by side with the secondary circuit 42 along the arrangement crossing direction.

The secondary circuit 42 is a synchronous rectifier circuit and a smoothing circuit including a plurality of switching elements and is provided on the base material 30, for example. The secondary circuit 42 is arranged on the base material 30 so as to face the terminals 12i and 12r and the coupling portion (center tap) 12j of the secondary winding 12a in the arrangement direction. The secondary circuit 42 is connected to the secondary winding 12a, and a load not depicted, rectifies AC power that is output from the secondary winding 12a, smooths the rectified DC power, and outputs it to the load. As in the foregoing, the primary circuit 41 and the secondary circuit 42 are mounted on the base material 30 side by side along the arrangement crossing direction.

The control circuit 43 is a circuit that controls the primary circuit 41 and the secondary circuit 42. The control circuit 43 is connected to the primary circuit 41, and performs on/off control of each switching element of the switching circuit, for example. Furthermore, the control circuit 43 is connected to the secondary circuit 42, and performs on/off control of each switching element of the synchronous rectifier circuit, for example.

Next, an operation example of the transformer device 1 will be described. The transformer device 1 outputs DC power to the primary circuit 41 from the DC power source, converts the DC power into AC power by the primary circuit 41, and outputs the AC power to the primary winding 11a.

Then, the transformer device 1 supplies AC power that is stepped down on the secondary side by the electromagnetic induction and the like of the primary winding 11a and the secondary winding 12a, rectifies the AC power, smooths the rectified DC power, and supplies it to the load.

Figure 8:
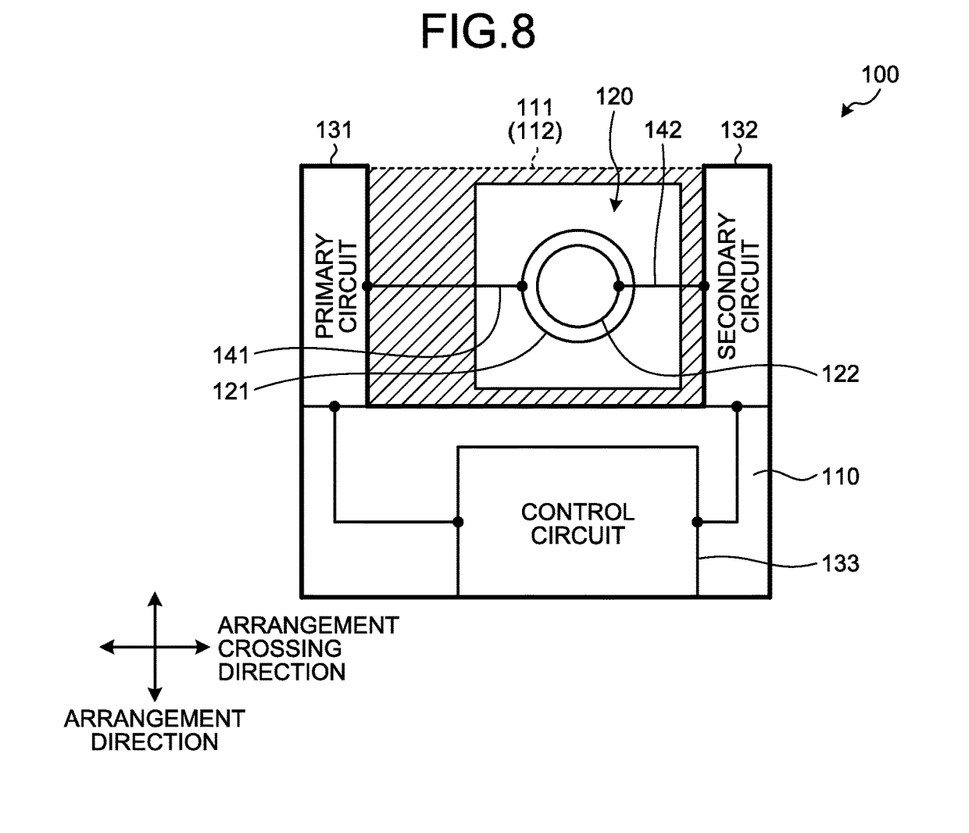
FIG. 8 is a schematic view illustrating a configuration example of a transformer device according to a comparative example.

Next, the transformer device 1 in the embodiment and a transformer device 100 according to a comparative example will be compared. In the transformer device 100 in the comparative example, as illustrated in FIG. 8, a base material 110 is formed in a U-shape and includes a cutout portion 111 for which the base material 110 is cut out. In the transformer device 100, a transformer 120 is arranged in the cutout portion 111 of the base material 110, and sandwiching the transformer 120, a primary circuit 131 is arranged on one side of the base material 110 and a secondary circuit 132 is arranged on the other side of the base material 110. Then, in the transformer device 100, a primary winding 121 and the primary circuit 131 are connected via a first wire 141, and a secondary winding 122 and the secondary circuit 132 are connected via a second wire 142. In the transformer device 100, the first wire 141 is drawn out to one side of the transformer 120 along the arrangement crossing direction, and the second wire 142 is drawn out to the other side of the transformer 120 along the arrangement crossing direction. The primary circuit 131 and the secondary circuit 132 are connected to a control circuit 133.

Figure 7:
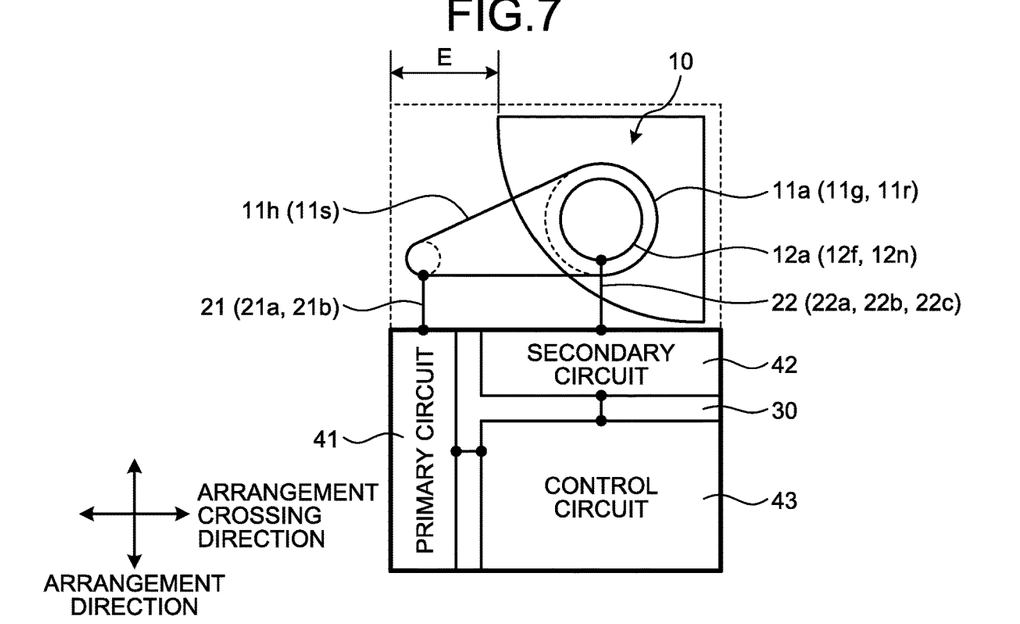
FIG. 7 is a schematic view illustrating a configuration example of the transformer device in the embodiment.

Meanwhile, the transformer device 1 in the embodiment, as illustrated in FIG. 7 and others, includes the transformer 10 including the primary winding 11a that is formed by winding the first conductor 11f and the secondary winding 12a provided to face the primary winding 11a and formed by winding the second conductor 12e, the first wires 21 connected to the primary winding 11a and drawn out to one side, the second wires 22 connected to the secondary winding 12a and drawn out to the side the same as the first wires 21, the base material 30 provided on the side from which the first wires 21 and the second wires 22 are drawn out, the primary circuit 41 provided on the base material 30 and connected to the primary winding 11a via the first wires 21, and the secondary circuit 42 provided on the base material 30 and connected to the secondary winding 12a via the second wires 22. As just described, in the transformer device 1 in the embodiment, because the first wires 21 connected to the primary winding 11a and the second wires 22 connected to the secondary winding 12a are drawn out to one side, as compared with the case where the transformer 120 is provided in the cutout portion 111 for which a part of the base material 110 is cut out, as in the transformer device 100 in the comparative example, and where the first and the second wires 141 and 142 are drawn out to both sides from the transformer 120, it is possible to make the cutout portion 111 unnecessary and to suppress a sacrificial base material 112. Thus, the transformer device 1 in the embodiment can suppress a structural waste and suppress the manufacturing cost. Furthermore, the transformer device 1 can make the processing of the cutout portion 111 unnecessary, and thus the processing of the base material 30 can be facilitated. Moreover, the transformer device 1 can reduce a free space where no circuit is formed on the base material 30 compared with the transformer device 100 in the comparative example, and thus an increase in size can be suppressed.

Furthermore, according to the transformer device 1, the primary circuit 41 and the secondary circuit 42 are provided side by side along the arrangement crossing direction that intersects with the drawing direction (arrangement direction) in which the first wires 21 and the second wires 22 are drawn out. As a result, the transformer device 1 can arrange the primary circuit 41 to face the primary winding 11a, and can arrange the secondary circuit 42 to face the secondary winding 12a. Accordingly, the transformer device 1 can relatively shorten the lengths of the first wires 21 and the second wires 22.

Furthermore, according to the transformer device 1, the primary winding 11a includes the leakage inductors 11h and 11s that do not contribute to transformation, and the leakage inductors 11h and 11s are provided on the primary circuit 41 side in the crossing direction. As a result, the transformer device 1 can make the leakage inductors 11h and 11s serve also as a part of the portion connecting the coil winding portions 11g and 11r and the terminals 11k and 11v, and can simplify the circuits. Furthermore, the transformer device 1 uses the leakage inductors 11h and 11s, and thus software switching by the primary circuit 41 is facilitated and the switching efficiency can be improved. The leakage inductors 11h and 11s can be provided in an area E where the primary winding 11a is connected to the primary circuit 41, the leakage inductors 11h and 11s can effectively use the area E without becoming a dead space. The transformer device 1 can, as compared with the case where resonance inductors are added in place of the leakage inductors 11h and 11s, suppress an increase in size. For example, when adding the resonance inductors, in order to insulate the transformer inductor and the resonance inductors, a certain distance needs to be left, and that may result in an increase in size.

Furthermore, according to the transformer device 1, the primary winding 11a is formed by winding the flat plate-like and linear first conductor 11f around both axis lines of the coil axis line X and the leakage-inductor axis line X1 located more toward the primary circuit 41 side in the arrangement crossing direction than the coil axis line X, the secondary winding 12a is formed by winding the flat plate-like and linear second conductor 12e around the coil axis line X, and the primary winding 11a and the secondary winding 12a are layer-stacked along the coil axis direction that is the direction along the coil axis line X. As a result, the transformer device 1 can configure the thin transformer 10 including the leakage inductors 11h and 11s.

Furthermore, according to the transformer device 1, the ferrite 14 on which the primary winding 11a and the secondary winding 12a are provided and containing the magnetic material is provided; the ferrite 14 includes the wall portion 14e annularly provided around the coil axis line X and surrounding the outer circumferences of the primary winding 11a and the secondary winding 12a; and the wall portion 14e includes the opening 14f that is opened to the primary circuit 41 and the secondary circuit 42 side, for which the opening angle θ centering the coil axis line X is 120° to 180°, and that exposes the leakage inductors 11h and 11s and the terminals 12i and 12r and the coupling portion (center tap) 12j of the secondary winding 12a. As a result, the transformer device 1 can suppress the opening angle θ of the opening 14f while exposing the leakage inductors 11h and 11s and the terminals 12i and 12r and the coupling portion (center tap) 12j of the secondary winding 12a. Accordingly, the transformer device 1 can suppress the leakage of the magnetic force of the primary winding 11a and the secondary winding 12a, and can reduce noise.

Modifications

Next, modifications of the embodiment will be described. Although the transformer device 1 has been described as the transformer 10 in which the thin primary winding 11a and the secondary winding 12a are layer-stacked, the embodiment is not limited thereto. The transformer device 1 may be a transformer in which a spiral primary winding and a secondary winding face each other, for example.

Furthermore, the transformer device 1 may be provided with a magnetic core for leakage along the leakage-inductor axis line X1. In this case, the primary winding 11a is formed so that the first conductor 11f circles both magnetic cores of the magnetic core 14d along the coil axis line X, and the magnetic core for leakage along the leakage-inductor axis line X1.

The transformer device according to the present embodiment includes a primary winding, a secondary winding, a first wire that is connected to the primary winding and drawn out to one side, and a second wire that is connected to the secondary winding and drawn out to the same side as that of the first wire. Accordingly, in the transformer device, the first wire connected to the primary winding and the second wire connected to the secondary winding are drawn out to one side, and thus, as compared with the case where a transformer is provided in a cutout portion for which a part of a base material is cut out and where wires are drawn out to both sides from the transformer, it is possible to make the cutout portion unnecessary and to suppress a sacrificial base material. As a result, the transformer device can suppress a structural waste.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transformer device comprising:
   a transformer including a primary winding formed by winding a first conductor and a secondary winding provided to face the primary winding and formed by winding a second conductor;
   a first wire connected to the primary winding and drawn out to one side;
   a second wire connected to the secondary winding and drawn out to same side as that of the first wire;
   a base material provided on a side from which the first wire and the second wire are drawn out;
   a primary circuit provided on the base material and connected to the primary winding via the first wire; and
   a secondary circuit provided on the base material and connected to the secondary winding via the second wire, wherein
   the primary circuit and the secondary circuit are provided side by side along a crossing direction that intersects with a drawing direction in which the first wire and the second wire are drawn out,
   the primary winding includes a leakage inductor that does not contribute to transformation, and
   the leakage inductor is provided on the primary circuit side in the crossing direction.

2. The transformer device according to claim 1, wherein
   the primary winding is formed by winding a flat plate-like and linear first conductor around both axis lines of a coil axis line and a leakage-inductor axis line located more toward the primary circuit side in the crossing direction than the coil axis line,
   the secondary winding is formed by winding a flat plate-like and linear second conductor around the coil axis line, and
   the primary winding and the secondary winding are layer-stacked along a coil axis direction that is a direction along the coil axis line.

3. The transformer device according to claim 2, further comprising:
   a magnetic member on which the primary winding and the secondary winding are provided and containing a magnetic material, wherein
   the magnetic member includes a wall portion annularly provided around the coil axis line and surrounding outer circumferences of the primary winding and the secondary winding, and
   the wall portion includes an opening that is opened on the primary circuit and the secondary circuit side, for which an opening angle centering the coil axis line is 120° to 180°, and that exposes the leakage inductor and terminals of the secondary winding.

* * * * *